United States Patent Office 3,010,560
Patented Nov. 28, 1961

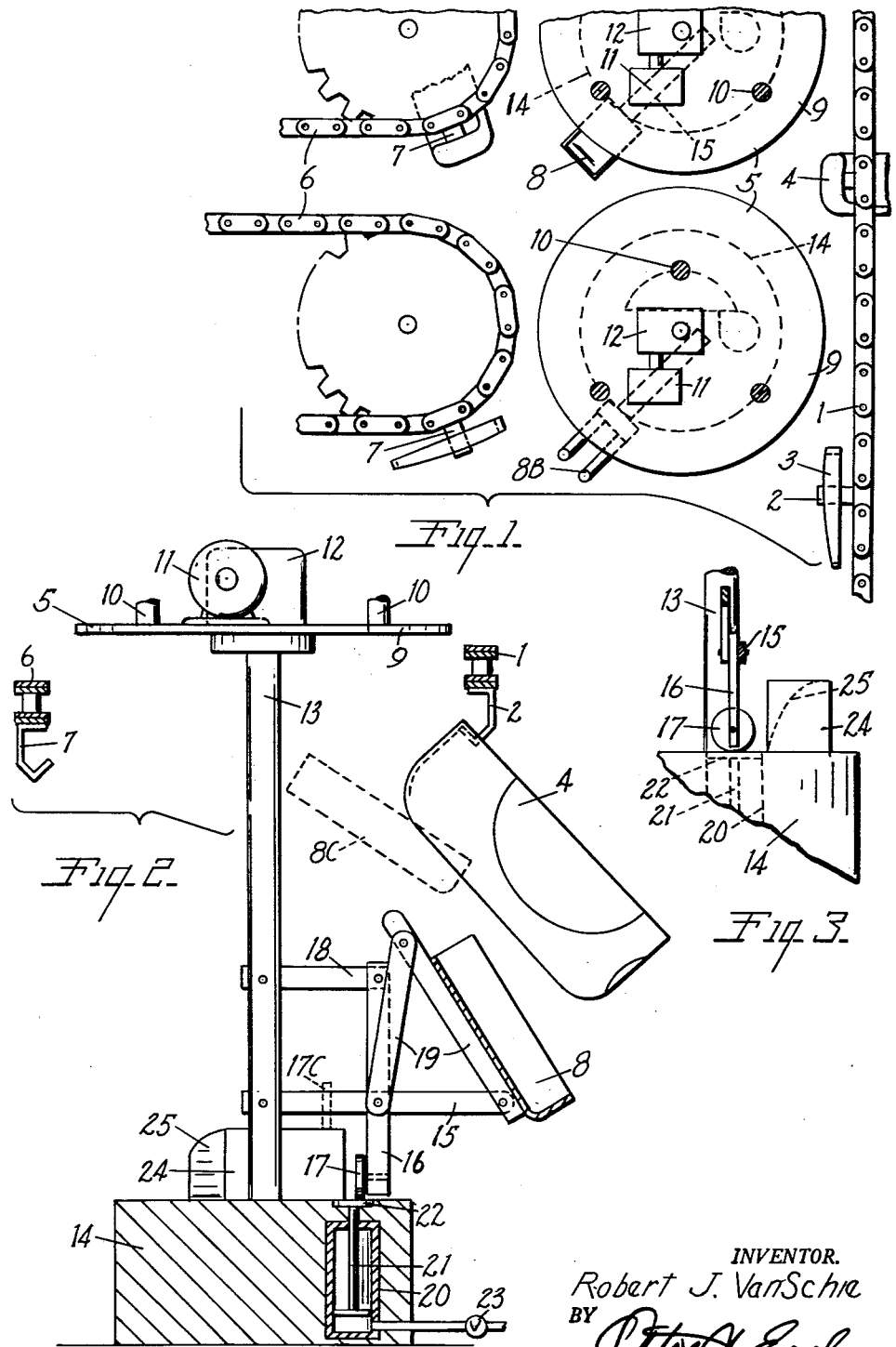

3,010,560
ARTICLE DISTRIBUTING CONVEYOR SYSTEMS
Robert J. Van Schie, Box 828, Kalamazoo, Mich.
(236 Jean St., Grand Rapids, Mich.)
Filed Dec. 29, 1958, Ser. No. 783,225
4 Claims. (Cl. 198—27)

This invention relates to article distributing conveyor systems. The principal objects of this invention are:

First, to provide a conveyor system for quickly and mechanically selecting similar articles from a series of intermixed articles advanced along one conveyor and transferring like articles to separate conveyors for further delivery or storage.

Second, to provide a novel form of transfer device positioned rotatably between two conveyors to pick articles off of one conveyor and transfer them to the other conveyor by rotation of the transfer device.

Third, to provide a rotatable transfer device which can be selectively rotated in unactuated inoperative position between two adjacent conveyors or actuated to move vertically during rotation to pick articles off of one conveyor and transfer them to another conveyor.

Fourth, to provide a conveyor system capable of sorting and storing various articles such as sheet metal stampings from the stamping department of an automotive factory by selectively picking like articles off of a delivery conveyor from the stamping department and transferring each type of article to a different storage conveyor.

Other objects and advantages of the invention will be apparent from a consideration of the following description and claims. The drawings of which there is one sheet illustrate a highly practical form of invention.

FIG. 1 is a fragmentary plan view of the delivery conveyor and the separate storage conveyors of the system with transfer devices operatively positioned therebetween.

FIG. 2 is a fragmentary and elevational view of one of the transfer devices with parts illustrated in cross section.

FIG. 3 is a fragmentary side elevational view of the transfer device shown in FIGS. 1 and 2 with the article carrier thereof broken away.

In automotive factories it is common to centralize the presses and other machinery necessary for producing the various sheet metal parts of automobiles and these parts once formed must be carried away to their points of assembly into automobiles. Continuous chain conveyors can conventionally be arranged to carry away many, if not all, of the stamping parts and, since it is impractical to schedule all stamping operations so that the parts are delivered in the exact sequence required for assembly, it is necessary to store or stockpile various different parts separately and the main delivery conveyor from the stamping department may carry different combinations or sequences of articles at different times. In order to economically handle and store the articles advanced along the delivery conveyor with a minimum of manual labor the present invention provides mechanically driven and selectively controlled transfer devices for selecting all like articles from the delivery conveyor and transferring them to a hold or storage conveyor. As many transfer devices and storage conveyors are provided as are required to handle the number of different parts to be stored.

In FIG. 1 there is illustrated more or less conventionally a delivery conveyor 1 having hooks 2 which are adapted to support and advance various articles of an automobile body such as the door frame stamping 3 and the fender stamping 4. Positioned alongside of the delivery conveyor 1 are plural transfer devices indicated generally at 5 and each arranged to take one type or shape of article off of the conveyor 1 and carry the article around through 180° and deposit it on one of the storage or holding conveyors indicated generally at 6. The storage conveyors are provided with suitable hooks or hangers 7 for receiving the articles from the transfer devices, the transfer devices 5 having article carriers 8 and 8B which are suitably shaped to support and translate the particular articles they are to handle. In the example illustrated, the article carriers 8B are designed to hook through the opening in the door frames 3 while the article carrier 8 is designed to support the bottom and sides of the inverted fender stamping 4.

The construction and operation of the transfer devices 5 is more particularly illustrated in FIGS. 2 and 3 wherein a circular motor support plate 9 is suitably supported above the level of the conveyors 1 and 6 as by the hanger rods 10. The support plate carriers a motor 11 connected through the gear box 12 to the upper end of a vertical shaft 13. The lower end of the shaft 13 is suitably journaled in a lower support 14. The motors 11 are synchronized by suitable controls (not illustrated) to rotate the shafts 13 in timed relation with the speed of advance of the hooks 2 on the delivery conveyor 1.

Pivotally supported near the lower end of the shaft 13 is a radially projecting boom 15. The boom rotates with the shaft to be positioned under each hook 2 as the hooks are advanced by the delivery conveyor. The upright link 16 pivoted to the boom intermediate of its ends carries a follower in the form of a wheel or roller 17 that rolls in a circle on a support 14 and holds the boom in generally horizontal position. The upper parallel arm 18 keeps the upright 16 in vertical position. Secured to the outer end of the boom 15 as by the triangularly arranged braces 19 is the article carrier 8 in the form of an open sided box shaped to receive and support the fender stampings 4.

In order to raise the article support 8 and pick the fender stampings off of the hooks 2 there is embedded in the support 14 a fluid actuated cylinder 20 having a piston rod 21 with a platform 22 on its upper end positioned flush with the surface of the support in the lowered position of the piston and in the path of rotation of the wheel or follower 17. Selectively controllable means such as the valve 23 are provided for admitting fluid pressure to the cylinder 20 to raise the piston and platform. Raising of the platform 22 raises the article carrier 8 to the position indicated by the dotted lines at 8C and incidentally moves the follower 17 radially inwardly to the position indicated by the dotted lines at 17C in FIG. 2.

In order to hold the boom 15 and the article carrier 8 in elevated position as they are rotated away from the conveyor 1 and as the follower 17 is rotated off of the platform 22 there is provided a second support 24 positioned on the lower support 14 and having a flat segmental top extending around a sector of the shaft 13. The rear or trailing end of the support 24 relative to the rotation of the follower 17 may be gradually downwardly cammed as at 25 to gradually lower the follower and boom 15 and the fender stampings carried thereby so that the fender stamping is lowered on to the hook 7 on the associated storage conveyor 6. Since the boom 15 and the article carrier 8 will not be actuated or raised with each hook 2 on the delivery conveyor due to the intermixing of other articles such as the door frames on the delivery conveyor the periphery of the second support 24 is located radially inwardly of the path of rotation of the follower 17 as shown in FIG. 2. Thus when the boom 15 swings into transverse registry with the hook 2 but the hook is carrying an unwanted part or no part at all the valve 23 may be left in unactuated position and the carrier 8 will rotate in lowered idling position around the raised support 24 with the boom 15 passing over the support.

The valve 23 of each of the platform actuating cylinders may be controlled manually by an operator observing the articles advancing along the delivery conveyor or automatic sensing switches (not illustrated) may be positioned to be actuated by different articles on the conveyor 1 to automatically actuate the several valves. The storage conveyors 6 may be driven intermittently in response to actuation of the valves 23 so that the storage conveyors advance only when an article is being transferred to them.

If desired the storage conveyor 6 and the transfer devices 5 can be reversely actuated to feed back a series of identical articles from the storage conveyor to the delivery conveyor or similar transfer devices may be utilized to transfer articles from the storage conveyors onto a conveyor timed and scheduled to assembly line operations.

What is claimed as new is:

1. A transfer device for transferring articles from a first conveyor to a storage conveyor comprising a rotatable upright shaft adapted to be driven in timed relation to said conveyors, a boom pivotally connected to the shaft and extending laterally therefrom, a first support extending in a circle around the shaft of said device, a follower connected to said boom and engageable with said first support to support said boom in a first relatively low position, a lift device positioned in said first support and having a platform located under said follower when said boom is projected toward said first conveyor, a second support positioned above said first support and extending around an arc of said circle from a point adjacent the raised position of said platform to support said follower in raised position from said platform, a downwardly cammed end on said second support at the opposite end thereof from said platform and opposite said storage conveyor, the periphery of said second support being located radially inwardly of the path of rotation of said follower in the lowered position of said follower, an article carrier on the swinging end of said boom positioned to lift articles off of said first conveyor as said boom is raised and to lower articles onto said storage conveyor as said follower lowers said boom in moving off of said second support, and means for selectively actuating said lift device.

2. A transfer device for transferring articles from a first conveyor to a storage conveyor comprising a rotatable upright shaft adapted to be driven in timed relation to said conveyors, a boom pivotally connected to the shaft and extending laterally therefrom, a first support extending in a circle around the shaft of said device, a follower connected to said boom and engageable with said first support to support said boom in a first relatively low position, a lift device having a platform located under said follower when said boom is projected toward said first conveyor, a second support positioned above said first support and extending around an arc of said circle from a point adjacent the raised position of said platform to support said follower in raised position from said platform, the end on said second support at the opposite end thereof from said platform being opposite said storage conveyor, said second support being located out of the path of rotation of said follower in the lowered position of said follower, an article carrier on the swinging end of said boom positioned to lift articles off of said first conveyor as said boom is raised and to lower articles onto said storage conveyor as said follower lowers said boom in moving off of said second support, and means for selectively actuating said lift device.

3. A transfer device for transferring articles from a first conveyor to a storage conveyor comprising a rotatable upright shaft adapted to be driven in timed relation to said conveyors, a boom pivotally connected to the shaft and extending laterally therefrom, a first support extending in a circle around the shaft of said device, a follower connected to said boom and engageable with said first support to support said boom in a first relatively low position, a lift device positioned in said first support and having a platform located under said follower when said boom is projected toward said first conveyor, means operative on said boom around an arc of said circle from a point adjacent the raised position of said platform to support said boom in raised position from said platform, means located at the opposite side of said shaft from said platform and opposite said storage conveyor operatively associated with said last boom supporting means to lower said boom, an article carrier on the swinging end of said boom positioned to lift articles off of said first conveyor as said boom is raised and to lower articles onto said storage conveyor as said boom is lowered, and means for selectively actuating said lift device.

4. A transfer device for transferring articles from a first conveyor to a second conveyor comprising an upright shaft positioned between said conveyors, means connected to rotate said shaft in timed relation to one of said conveyors, a boom pivotally connected to said shaft and extending laterally therefrom to project toward an article on the first of said conveyors as the article is advanced by said first conveyor, an article support on said boom arranged to receive the article from said first conveyor and support the article, a first support means supporting said boom in a relatively low position as said boom approaches said first conveyor, selectively operable second means engageable with said boom to raise the boom to a relatively high level at a point opposite said first conveyor, a third means operative on said boom around an arc from said first conveyor to said second conveyor to support said boom at said high level, and a fourth means cooperative with said third means when said boom is opposite said second conveyor to lower said boom to said lower level.

References Cited in the file of this patent

UNITED STATES PATENTS

| | | |
|---|---|---|
| 2,120,052 | Bishop | June 7, 1938 |
| 2,207,179 | Schreiber | July 9, 1940 |
| 2,612,255 | Leuschner | Sept. 30, 1952 |
| 2,771,175 | Da Costa | Nov. 20, 1956 |

UNITED STATES PATENT OFFICE
CERTIFICATE OF CORRECTION

Patent No. 3,010,560    November 28, 1961

Robert J. Van Schie

It is hereby certified that error appears in the above numbered patent requiring correction and that the said Letters Patent should read as corrected below.

In the grant, lines 1 to 3, for "Robert J. Van Schie, of Kalamazoo, Michigan," read -- Robert J. Van Schie, of Grand Rapids, Michigan, --; in the heading to the printed specification, lines 3 and 4, for "Robert J. Van Schie, Box 828, Kalamazoo, Mich. (236 Jean St., Grand Rapids, Mich.)" read -- Robert J. Van Schie, 236 Jean St., Grand Rapids, Mich. --.

Signed and sealed this 12th day of June 1962.

(SEAL)
Attest:

ERNEST W. SWIDER
Attesting Officer

DAVID L. LADD
Commissioner of Patents